United States Patent
Hoson

(10) Patent No.: US 9,218,548 B2
(45) Date of Patent: Dec. 22, 2015

(54) CARD READER AND CONTROL METHOD THEREFOR

(71) Applicant: NIDEC SANKYO CORPORATION, Suwa-gun, Nagano (JP)

(72) Inventor: Keiji Hoson, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/519,716

(22) Filed: Oct. 21, 2014

(65) Prior Publication Data

US 2015/0115031 A1    Apr. 30, 2015

(30) Foreign Application Priority Data

Oct. 24, 2013  (JP) .................................. 2013-221449

(51) Int. Cl.
*G06K 7/08*    (2006.01)
*G06K 13/08*   (2006.01)

(52) U.S. Cl.
CPC .................................. *G06K 13/0868* (2013.01)

(58) Field of Classification Search
CPC ...................................................... G06K 7/087
USPC .................... 235/379, 375, 450, 449
See application file for complete search history.

(56) References Cited

U.S. PATENT DOCUMENTS

| 6,236,200 | B1* | 5/2001 | Nekado et al. | 324/207.26 |
|---|---|---|---|---|
| 7,296,683 | B1* | 11/2007 | Vallelonga et al. | 209/224 |
| 8,640,947 | B1* | 2/2014 | Lewis et al. | 235/379 |
| 2011/0006112 | A1* | 1/2011 | Mueller | 235/379 |
| 2013/0119136 | A1* | 5/2013 | Ishikawa et al. | 235/449 |
| 2014/0158768 | A1* | 6/2014 | Ray et al. | 235/449 |

FOREIGN PATENT DOCUMENTS

JP    2013-37555 A    2/2013

* cited by examiner

*Primary Examiner* — Allyson Trail
(74) *Attorney, Agent, or Firm* — Cantor Colburn LLP

(57) ABSTRACT

A card reader for use with a card having magnetic data recorded thereon may include a magnetic head for carrying out at least one of reading the magnetic data recorded in the card and recording the magnetic data into the card; a card insertion part where an insertion slot for inserting the card is formed; a metal sensor structured to detect a foreign object, which contains a metallic material, having been installed around the card insertion part; and a control unit. The control unit may be structured to calculate the amount of change in an output value of the metal sensor, whenever a predetermined reference time period has passed, and judge that the foreign object has been installed around the card insertion part if the amount of change exceeds a predetermined reference value.

5 Claims, 5 Drawing Sheets

DISTANCE BETWEEN FOREIGN OBJECT AND METAL SENSOR

AMBIENT TEMPERATURE OF METAL SENSOR

CARD READER AND CONTROL METHOD THEREFOR

CROSS REFERENCE TO RELATED APPLICATION

The present invention claims priority under 35 U.S.C. §119 to Japanese Application No. 2013-221449 filed Oct. 24, 2013, the entire contents of which are incorporated herein by reference.

FIELD OF THE INVENTION

The present invention relates to a card reader that executes at least one of reading magnetic data recorded in a card and recording magnetic data into a card. Moreover, the present invention also relates to a control method therefor.

BACKGROUND

Conventionally, card readers for reading magnetic data recorded in a card and recording magnetic data into a card are widely used. In the industry of financial organizations and the like in which card readers are used, traditionally so-called "skimming" is a serious issue in which a criminal installs a magnetic head at a card insertion part of a card reader so as to illegally obtain magnetic data of the card by use of the magnetic head. In order to avoid such a problem, proposed is a card reader equipped with a metal sensor for detecting a magnetic head for skimming (hereinafter, called a "skimming magnetic head") having been installed at a card insertion part (for example, refer to Patent Document 1).

In a card reader described in Patent Document 1, a metal sensor includes a core made of a magnetic material, a couple of exciting coils wound on the core, and a detection coil. A value of voltage generated at both end parts of the detection coil fluctuates in accordance with a distance between the metal sensor and a foreign object containing a metallic material, for example, as shown in FIG. 6. Concretely to describe, if the metal sensor and the foreign object are positioned close to each other, the value of voltage becomes greater; and meanwhile if the metal sensor and the foreign object are positioned distant from each other, the value of voltage becomes small. Therefore, depending on whether or not the value of voltage of the detection coil exceeds a predetermined threshold value, it can be judged whether or not a skimming magnetic head has been installed at a card insertion part.

In the meantime, if an ambient temperature of the metal sensor fluctuates, a resistance and the like of the detection coil fluctuate accordingly so that the value of voltage of the detection coil fluctuates in accordance with the ambient temperature of the metal sensor, for example as a solid line curve shows in FIG. 7, even though the distance between the metal sensor and the foreign object stays constant. Therefore, if the threshold value to be compared with the value of voltage of the detection coil is constant and the ambient temperature of the metal sensor fluctuates, it cannot appropriately be judged whether or not a skimming magnetic head has been installed at the card insertion part.

Therefore, the card reader described in Patent Document 1 is provided with a temperature sensor for measuring an ambient temperature of the metal sensor; and a plurality of threshold values, each of which is in relation to an ambient temperature of the metal sensor, are stored in a control unit of the card reader. Moreover, in the card reader, a threshold value, to be compared with the value of voltage of the detection coil, is selected out of the plurality of threshold values stored in the control unit, in accordance with the ambient temperature of the metal sensor measured by use of the temperature sensor; and the selected threshold value is set up. As a result, even though the ambient temperature of the metal sensor fluctuates, the card reader can appropriately make a judgment on whether or not a skimming magnetic head has been installed at the card insertion part.

PATENT DOCUMENT

Patent Document 1: Japanese Unexamined Patent Application Publication No. 2013-37555

As mentioned above, the card reader described in Patent Document 1 can appropriately make a judgment on whether or not a skimming magnetic head has been installed at the card insertion part, even though the ambient temperature of the metal sensor fluctuates. In the meantime, characteristics of a voltage value fluctuation of the detection coil, in association with a fluctuation of the ambient temperature of the metal sensor (namely, temperature-wise fluctuation characteristics of the metal sensor) are variable among metal sensors. For example, in the case of a certain metal sensor, a value of voltage of a detection coil fluctuates in accordance with an ambient temperature of the metal sensor, as the solid line curve shows in FIG. 7. Meanwhile, in the case of another metal sensor, sometimes a value of voltage of a detection coil could fluctuate in accordance with an ambient temperature of the metal sensor, as a dotted line curve shows in FIG. 7. Therefore, also in the case of the card reader described in Patent Document 1, if the temperature-wise fluctuation characteristics are variable among metal sensors, potentially it cannot be judged appropriately in reality whether or not a skimming magnetic head has been installed at the card insertion part, without storing a plurality of threshold values in the control unit individually with respect to each metal sensor, each of the threshold values being in relation to an ambient temperature of the metal sensor. Unfortunately, in the case where the plurality of threshold values, each of which is in relation to an ambient temperature of the metal sensor, are stored in the control unit individually with respect to each metal sensor, a manufacturing process of the card reader becomes complicated so that productivity of the card reader is lowered.

Then, at least an embodiment of the present invention provides a card reader that can appropriately judge whether or not a foreign object containing a metallic material has been installed at a card insertion part even though an ambient temperature of a metal sensor fluctuates, and with which lowering productivity at the time of manufacturing the card reader can be controlled. Moreover, at least an embodiment of the present invention provides a control method for the card reader that can appropriately judge whether or not a foreign object containing a metallic material has been installed at the card insertion part even though an ambient temperature of the metal sensor fluctuates, and with which lowering productivity at the time of manufacturing the card reader can be controlled.

SUMMARY

In order to bring a solution for the subject described above, an inventor of the present invention has made various studies. Focusing in particular on characteristics of the metal sensor for detecting a foreign object that; under an environment where the card reader is actually used, the ambient temperature of the metal sensor does not fluctuate suddenly, and therefore a sudden change in an output value of the metal sensor owing to a fluctuation of the ambient temperature of the metal sensor does not happen; and in the meantime, it is hardly expected that the foreign object is slowly installed at the card insertion part at the time when a foreign object containing a metallic material is installed at the card insertion part; and accordingly, a change in an output value of the metal sensor owing to an installation of the foreign object at the card insertion part is a quick change; the inventor of the present invention has made various studies. As a result, the inventor of the present invention comes to an understanding that; if a method of processing the output value of the metal sensor is devised, it becomes possible to appropriately judge whether or not the foreign object containing the metallic material has been installed at the card insertion part even though the ambient temperature of the metal sensor fluctuates, and to control lowering productivity at the time of manufacturing the card reader.

Moreover, a card reader according to at least an embodiment of the present invention is based on such a new understanding; and the card reader includes: a magnetic head for carrying out at least one of reading magnetic data recorded in a card and recording magnetic data into the card; a card insertion part where an insertion slot for inserting the card is formed; a metal sensor for detecting a foreign object, which contains a metallic material, having been installed around the card insertion part; and a control unit; wherein the control unit calculates the amount of change in an output value of the metal sensor, whenever a predetermined reference time period has passed, and judges that the foreign object has been installed around the card insertion part if the amount of change exceeds a predetermined reference value.

Moreover, a control method for a card reader according to at least an embodiment of the present invention is based on the new understanding described above; and the control method is for a card reader that includes a magnetic head for carrying out at least one of reading magnetic data recorded in a card and recording magnetic data into the card; a card insertion part where an insertion slot for inserting the card is formed; and a metal sensor for detecting a foreign object, which contains a metallic material, having been installed around the card insertion part; wherein the amount of change in an output value of the metal sensor is calculated, whenever a predetermined reference time period has passed, and it is judged that the foreign object has been installed around the card insertion part if the amount of change exceeds a predetermined reference value.

In the card reader according to at least an embodiment of the present invention, the control unit calculates the amount of change in an output value of the metal sensor, whenever a predetermined reference time period has passed, and judges that the foreign object has been installed around the card insertion part if the amount of change exceeds a predetermined reference value. Moreover, in the control method for a card reader according to at least an embodiment of the present invention, the amount of change in an output value of the metal sensor is calculated, whenever a predetermined reference time period has passed, and it is judged that the foreign object has been installed around the card insertion part if the amount of change exceeds a predetermined reference value.

As described above, a sudden change in an output value of the metal sensor owing to a fluctuation of the ambient temperature of the metal sensor does not happen; and in the meantime, a change in an output value of the metal sensor owing to an installation of the foreign object at the card insertion part is a quick change. Therefore, by way of comparing the amount of change in the output value of the metal sensor in the predetermined reference time period to the reference value, it becomes possible to appropriately judge whether or not the foreign object containing a metallic material has been installed at the card insertion part. Furthermore, as described above, there exists no sudden change in the output value of the metal sensor owing to a fluctuation of the ambient temperature of the metal sensor. Therefore, in at least an embodiment of the present invention, the amount of change in the output value can be calculated, with an impact of the fluctuation of the ambient temperature of the metal sensor being controlled by way of calculating the amount of change in the output value of the metal sensor whenever the reference time period has passed. As described above, in at least an embodiment of the present invention, it becomes possible to appropriately judge whether or not the foreign object containing a metallic material has been installed at the card insertion part even though the ambient temperature of the metal sensor fluctuates. Moreover, at least an embodiment of the present invention makes it possible to calculate the amount of change in the output value, with the impact of the fluctuation of the ambient temperature of the metal sensor being controlled. As a result, it becomes possible to control an impact of a variation in temperature-wise fluctuation characteristics of each metal sensor, the impact of the variation being exerted on the amount of change in the output value. Therefore, without storing a plurality of datum values, individually with respect to each metal sensor, each of the datum values being in relation to an ambient temperature of the metal sensor, storing those datum values being needed in a conventional technology; at least an embodiment of the present invention makes it possible to appropriately judge whether or not the foreign object containing a metallic material has been installed at the card insertion part when an ambient temperature of the metal sensor changes. Accordingly, it becomes possible to control lowering productivity of manufacturing the card reader.

In the card reader according to at least an embodiment of the present invention, it is preferable that the control unit calculates a difference between a reference output value and an output value of the metal sensor at the time when the reference time period has passed, as the amount of change; and moreover initially sets up the reference output value with an output value of the metal sensor at the time of turning on the card reader; and if the amount of change is equal to or less than a predetermined second datum value that is smaller than the reference value, updating the reference output value is carried out to set up the reference output value with an output value of the metal sensor at the time when the reference time period has passed; and if the amount of change is greater than the second datum value, updating the reference output value is not carried out in such a way as to maintain the reference output value.

Moreover, in the control method for a card reader according to at least an embodiment of the present invention, it is preferable that a difference between a reference output value and an output value of the metal sensor, at the time when the reference time period has passed, is calculated as the amount of change; and moreover, the reference output value is initially set up with an output value of the metal sensor at the time of turning on the card reader; and if the amount of change is equal to or less than a predetermined second datum value that is smaller than the reference value, updating the reference output value is carried out to set up the reference output value with an output value of the metal sensor at the time when the reference time period has passed; and if the amount of change is greater than the second datum value, updating the reference output value is not carried out in such a way as to maintain the reference output value.

According to this configuration, in the case where the amount of change is equal to or less than the second datum value, the reference output value is updated in such a way that the reference output value is set up with the output value of the metal sensor at the time when the reference time period has passed. Therefore, it becomes possible to calculate the amount of change in the output value for which an impact of the fluctuation of the ambient temperature of the metal sensor is further controlled. Meanwhile, in the case where the amount of change is greater than the second datum value, there is a chance that a foreign object is approaching the card insertion part at the time. Therefore, when the amount of change is greater than the second datum value, it becomes possible to appropriately calculate the amount of change in the output value of the metal sensor for making a judgment on whether or not the foreign object has been installed at the card insertion part, by way of maintaining the reference output value without updating it.

In at least an embodiment of the present invention, the card reader may comprises a temperature sensor for measuring an ambient temperature of the metal sensor, the temperature sensor being placed in the proximity of the metal sensor; and the control unit may calculate a difference between a reference output value and an output value of the metal sensor at the time when the reference time period has passed, as the amount of change; and moreover may initially set up the reference output value, on the basis of a detection result by the temperature sensor, at the time of turning on the card reader; and if the amount of change is equal to or less than a predetermined second datum value that is smaller than the reference value, updating the reference output value may be carried out to set up the reference output value with an output value of the metal sensor at the time when the reference time period has passed; and if the amount of change is greater than the second datum value, updating the reference output value may not be carried out in such a way as to maintain the reference output value. In this case, even if the foreign object containing a metallic material has been installed at the card insertion part before turning on the card reader, the amount of change in the output value of the metal sensor for judging whether or not the foreign object has been installed at the card insertion part can appropriately be calculated by use of the reference output value set up initially. Furthermore, in this case, if the amount of change is equal to or less than the second datum value, the reference output value is updated in such a way that the reference output value is set up with the output value of the metal sensor at the time when the reference time period has passed. Therefore, it becomes possible to calculate the amount of change in the output value for which an impact of the fluctuation of the ambient temperature of the metal sensor is further controlled. Meanwhile, in the case where the amount of change is greater than the second datum value, there is a chance that a foreign object is approaching the card insertion part at the time. Therefore, when the amount of change is greater than the second datum value, it becomes possible to appropriately calculate the amount of change in the output value of the metal sensor for making a judgment on whether or not the foreign object has been installed at the card insertion part, by way of maintaining the reference output value without updating it. Incidentally, in the present application, "being placed in the proximity of the metal sensor" means placement within an area where an ambient temperature of the metal sensor can appropriately be sensed.

In at least an embodiment of the present invention, it is preferable that, for example, the metal sensor comprises; a core formed of a magnetic material, a couple of exciting coils that are wound on the core, and a detection coil that is wound on the core between the couple of exciting coils in an axis direction of the core; under conditions where the foreign object does not exist in a detectable area of the metal sensor, no voltage is generated between both terminals of the detection coil; and meanwhile, if the foreign object exists in the detectable area of the metal sensor, a voltage is generated between both the terminals of the detection coil; and the output value of the metal sensor is a value of the voltage between both the terminals of the detection coil.

Advantageous Effect of the Invention

As described above, the card reader according to at least an embodiment of the present invention can appropriately judge whether or not a foreign object containing a metallic material has been installed at the card insertion part even though an ambient temperature of the metal sensor fluctuates; and lowering productivity at the time of manufacturing the card reader can be controlled. Moreover, using the control method for the card reader according to at least an embodiment of the present invention makes it possible to appropriately judge whether or not a foreign object containing a metallic material has been installed at the card insertion part even though an ambient temperature of the metal sensor fluctuates, and to control lowering productivity at the time of manufacturing the card reader.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE EMBODIMENTS

An embodiment of the present invention is described below with reference to the accompanying drawings.
(Structure of Card Reader)

Figure 1:
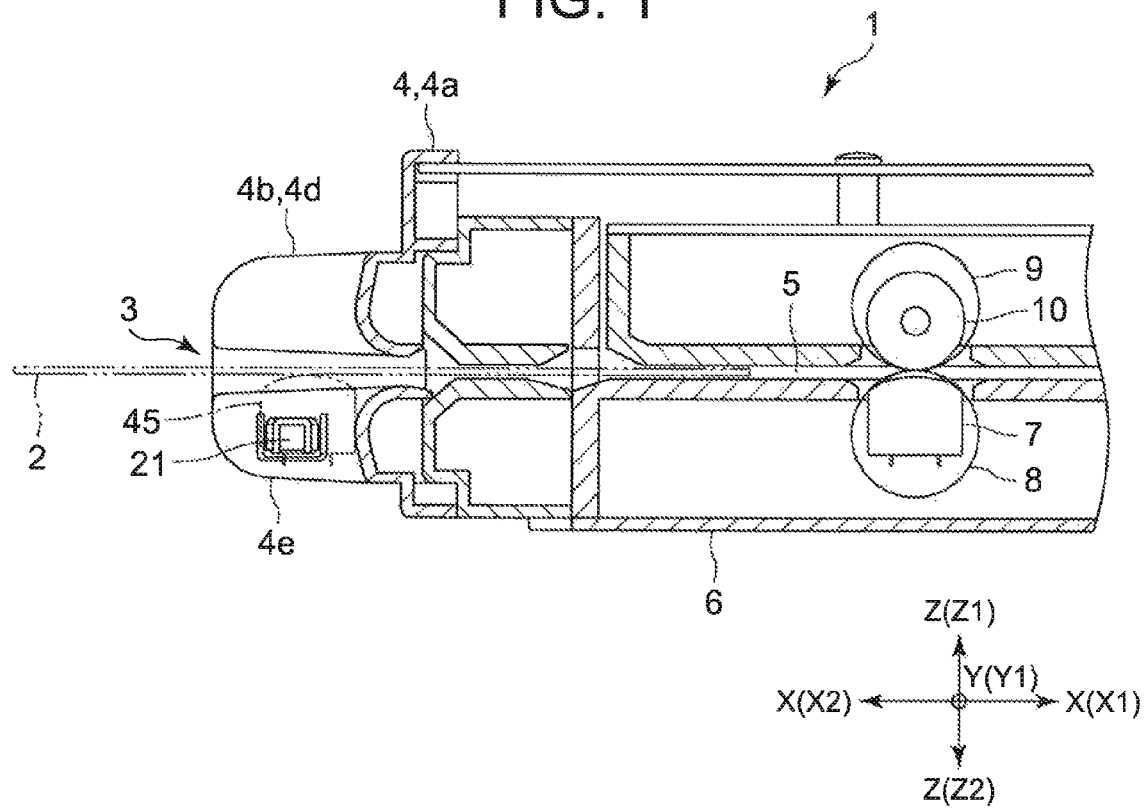
FIG. 1 is a schematic cross-sectional view at a front side of a card reader according to an embodiment of the present invention.
Figure 2:
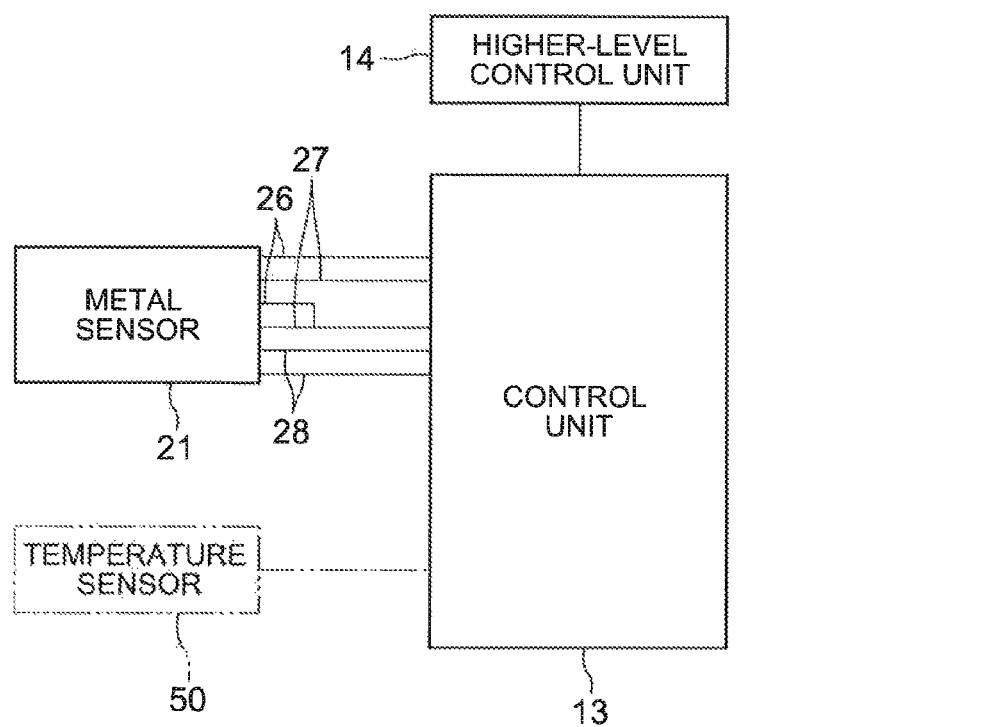
FIG. 2 is a block diagram of a control unit of the card reader shown in FIG. 1 and a configuration in relation to the control unit.
Figure 3:
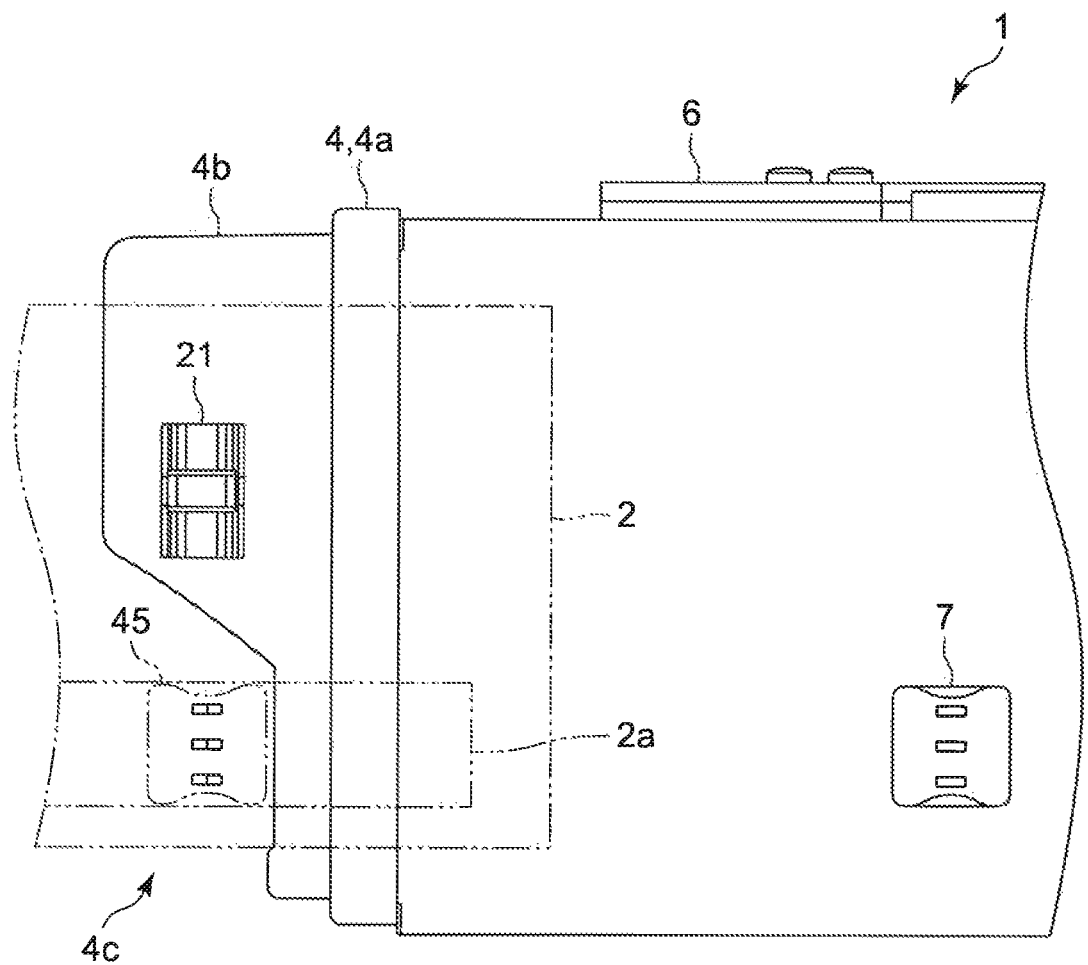
FIG. 3 is a schematic plan view for explaining a structure at a front side of the card reader shown in FIG. 1.
Figure 4:
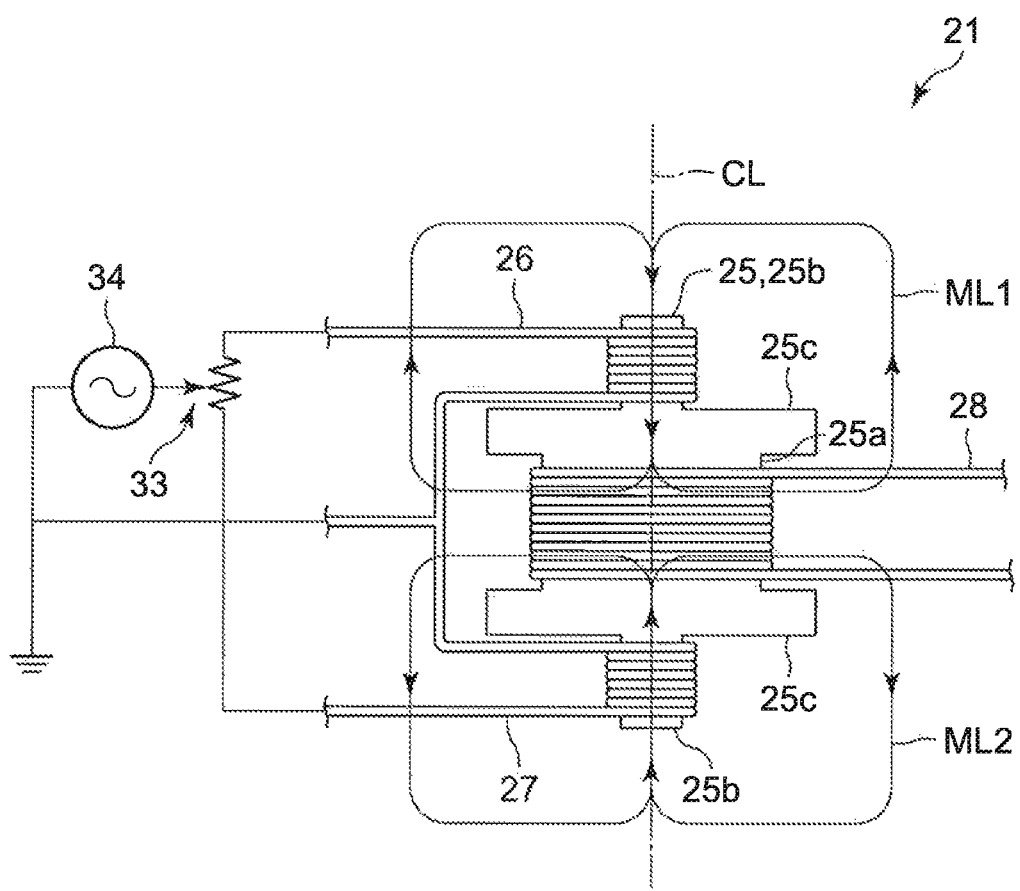
FIG. 4 is a diagram for explaining a structure of a metal sensor shown in FIG. 3.

FIG. 1 is a schematic cross-sectional view at a front side of a card reader 1 according to an embodiment of the present invention. FIG. 2 is a block diagram of a control unit 13 of the card reader 1 shown in FIG. 1 and a configuration in relation to the control unit 13. FIG. 3 is a schematic plan view for explaining a structure at a front side of the card reader 1 shown in FIG. 1. FIG. 4 is a diagram for explaining a structure of a metal sensor 21 shown in FIG. 3.

The card reader 1 according to the present embodiment is a device to carry out reading magnetic data recorded in a card 2 and recording magnetic data into the card 2. For example, being installed in a predetermined higher-level device such as an ATM and the like, the card reader 1 is used. As shown in FIG. 1, the card reader 1 includes; a card insertion part 4 in which an insertion slot 3 for inserting the card 2 is formed; and a main body 6 in which a card transfer path 5 for transferring the card 2 is formed. A magnetic head 7 for carrying out at least one of reading magnetic data and recording magnetic data, and a driving roller 8 and a pad roller 9 for transferring the card 2 are laid out inside the main body 6. Moreover, the card reader 1 is provided with the control unit 13 that controls the card reader 1, as shown in FIG. 2. The control unit 13 includes electronic components; such as a CPU, a ROM, a RAM and the like. The control unit 13 is connected to a control unit of the higher-level device (higher-level control unit) 14, the card reader 1 being installed in the higher-level device.

In the present embodiment, the card 2 is transferred in an X-direction shown in FIG. 1 and so on. Concretely to describe, the card 2 is inserted in an X1-direction, and ejected in an X2-direction. Then, a Z-direction shown in FIG. 1 and others, being perpendicular to the X-direction, is a direction of a thickness of the card 2 to be inserted into the card reader 1; and meanwhile a Y-direction in FIG. 1 and others, being perpendicular to the X-direction and the Z-direction, is a direction of a width of the card 2 to be inserted into the card reader 1 (widthwise direction). In the following explanation, an X1-direction side is a "rear (back)" side, an X2-direction side is a "front" side, a Y1-direction side is a "right" side, a Y2-direction side is a "left" side, a Z1-direction side is an "upper" side, and a Z2-direction side is a "lower" side.

For example, the card 2 is a rectangular card made of polyvinyl chloride, having a thickness of about 0.7 to 0.8 mm. A magnetic strip 2a (refer to FIG. 3), in which magnetic data is recorded, is formed at the reverse side (under surface) of the card 2. Incidentally, the card 2 may be a polyethylene terephthalate (PET) card having a thickness of about 0.18 to 0.36 mm, or a paper card having a predetermined thickness, and the like.

The magnetic head 7 is placed in such a way that a gap part of the magnetic head 7 faces the card transfer path 5 from a lower side. Moreover the magnetic head 7 is located at a position where the magnetic head 7 can contact the magnetic strip 2a of the card 2. A facing roller 10 is placed above the magnetic head 7 in such a way that the facing roller 10 and the magnetic head 7 are facing each other in a vertical direction. The driving roller 8 is so placed as to face the card transfer path 5 from a lower side. Being positioned above the driving roller 8 so as to face the driving roller 8, the pad roller 9 is pressed against the driving roller 8.

The card insertion part 4 is installed to a front end side of the main body 6. The card insertion part 4 includes a fixing part 4a to be fixed to the main body 6, and a protrusion 4b protruding frontward from the fixing part 4a. The protrusion 4b is not formed all across an entire section of the card insertion part 4 in a right-and-left direction. Concretely to describe, the protrusion 4b is formed only in a predetermined extent from a left end of the card insertion part 4 toward a right end side; and at a right side of the protrusion 4b, there exists no protrusion part protruding frontward from the fixing part 4a, in such a way as to provide a cutout portion 4c there.

The protrusion 4b is so formed as to be hollow. Moreover, the protrusion 4b includes an upper protrusion 4d and a lower protrusion 4e, which are so placed as to sandwich the insertion slot 3 between them in a vertical direction. Inside the lower protrusion 4e placed at a lower side of the insertion slot 3, there is located the metal sensor 21 for detecting a foreign object, which contains a metallic material, having been installed around the card insertion part 4. Furthermore, in the protrusion 4b, there is placed a card detector (not illustrated in the drawings) for detecting the card 2 having been inserted into the insertion slot 3.

As shown in FIG. 3, in a right-and-left direction, the cutout portion 4c is formed at a position where the magnetic head 7 is placed. In other words, the cutout portion 4c is formed at a position where the magnetic strip 2a of the card 2 passes over. In the present embodiment, a front end side of the card 2, ejected out of the card reader 1 by use of the driving roller 8 and the pad roller 9, is exposed at the cutout portion 4c. Then, if once the card 2 is ejected out of the card reader 1, a user holds the front end side of the card 2 exposed at the cutout portion 4c, and draws the card 2 out of the card reader 1.

The metal sensor 21 includes; a core 25 formed of a magnetic material, a couple of exciting coils 26 and 27 that are wound on the core 25 while being centered around a center axis 'CL' of the core 25, and a detection coil 28, as shown in FIG. 4.

The core 25 is formed as a thin plate having its thickness direction in a direction perpendicular to the plane of paper of FIG. 4. The core 25 is composed of; a central core portion 25a positioned almost at a center part in an axis direction of the center axis 'CL', a couple of axis-end core portions 25b each of which is positioned at each of both ends of the central core portion 25a in the axis direction of the center axis 'CL', and widened portions 25c, each of which positioned between the central core portion 25a and each of the axis-end core portions 25b. A width of the central core portion 25a is wider than a width of the axis-end core portions 25b. Moreover, a width of the widened portions 25c is wider than the width of the central core portion 25a. The core 25 is placed in such a way that the axis direction of the center axis 'CL' is almost consistent with the right-and-left direction.

The exciting coils 26 and 27 are individually wound on each of the couple of the axis-end core portions 25b. The detection coil 28 is wound on the central core portion 25a. In other words, the detection coil 28 is wound on the core 25 between the couple of exciting coils 26 and 27 in the axis direction of the center axis 'CL'. Each one terminal of the exciting coils 26 and 27 is electrically connected to a variable resistor 33 that configures a part of the control unit 13. The variable resistor 33 is electrically connected to an AC power supply unit 34. The other terminals of the exciting coils 26 and 27 are electrically connected to a ground pattern, which configures a part of the control unit 13, so as to be connected to ground. Both terminals of the detection coil 28 are electrically connected to a voltage detection circuit that configures a part of the control unit 13.

The metal sensor 21 serves a function of detecting a change in magnetic fields, which the exciting coils 26 and 27 generate, by the detection coil 28 in order to detect a foreign object having been installed around the card insertion part 4, wherein the foreign object containing a metallic material. Concretely to describe, the metal sensor 21 serves a function of detecting a skimming magnetic head 45 (refer to FIG. 3) having been installed at a front surface side of the card insertion part 4. Therefore, the metal sensor 21 is placed in such a way that either a magnetic field line ML1 representing the magnetic field generated by the exciting coil 26 or a magnetic field line ML2 representing the magnetic field generated by the exciting coil 27 passes through an installation spot of the skimming magnetic head 45. Concretely to describe, since the skimming magnetic head 45 is assumed to be installed at the cutout portion 4c, the metal sensor 21 is placed in such a way that either the magnetic field line ML1 or the magnetic field line ML2 passes through the cutout portion 4c.

The exciting coils 26 and 27 become excited in such a way that; under conditions where no skimming magnetic head 45 exists in a detectable area of the metal sensor 21 (an area through which the magnetic field line ML1 and the magnetic field line ML2 pass), a density of the magnetic field line ML1 and a density of the magnetic field line ML2 are well-balanced, and moreover a direction of the magnetic field line ML1 and a direction of the magnetic field line ML2 are reversed each other. Namely, the variable resistor 33 is adjusted in such a way that; under conditions where no skimming magnetic head 45 exists in the detectable area of the metal sensor 21, a balance between the magnetic field generated by the exciting coil 26 and the magnetic field generated by the exciting coil 27 is achieved. In other words, the variable resistor 33 is adjusted in such a way that; under conditions where no skimming magnetic head 45 exists in the detectable area of the metal sensor 21, no voltage is generated between both the terminals of the detection coil 28. Therefore, if once the skimming magnetic head 45 is installed in the detectable area of the metal sensor 21, an impact of the skimming magnetic head 45 breaks down a balance between the magnetic field generated by the exciting coil 26 and the magnetic field generated by the exciting coil 27 so that a voltage is generated between both the terminals of the detection coil 28.

In the present embodiment, the skimming magnetic head 45 having been installed around the card insertion part 4 is detected on the basis of a value of the voltage (voltage value) generated between both the terminals of the detection coil 28. In other words, in the present embodiment, the skimming magnetic head 45 having been installed around the card insertion part 4 is detected on the basis of an output value of the metal sensor 21. Concretely to describe, the control unit 13 calculates the amount of change in output value of the metal sensor 21 (namely, the voltage value of the detection coil 28), whenever a predetermined reference time period has passed. If the amount of change exceeds a predetermined reference value, the control unit 13 judges that the skimming magnetic head 45 has been installed at the front surface side of the card insertion part 4. Explained below is an example of a control method of the card reader 1 in a process of detecting the skimming magnetic head 45.

(Control Method of a Foreign Object Detecting Process in the Card Reader)

Figure 5:
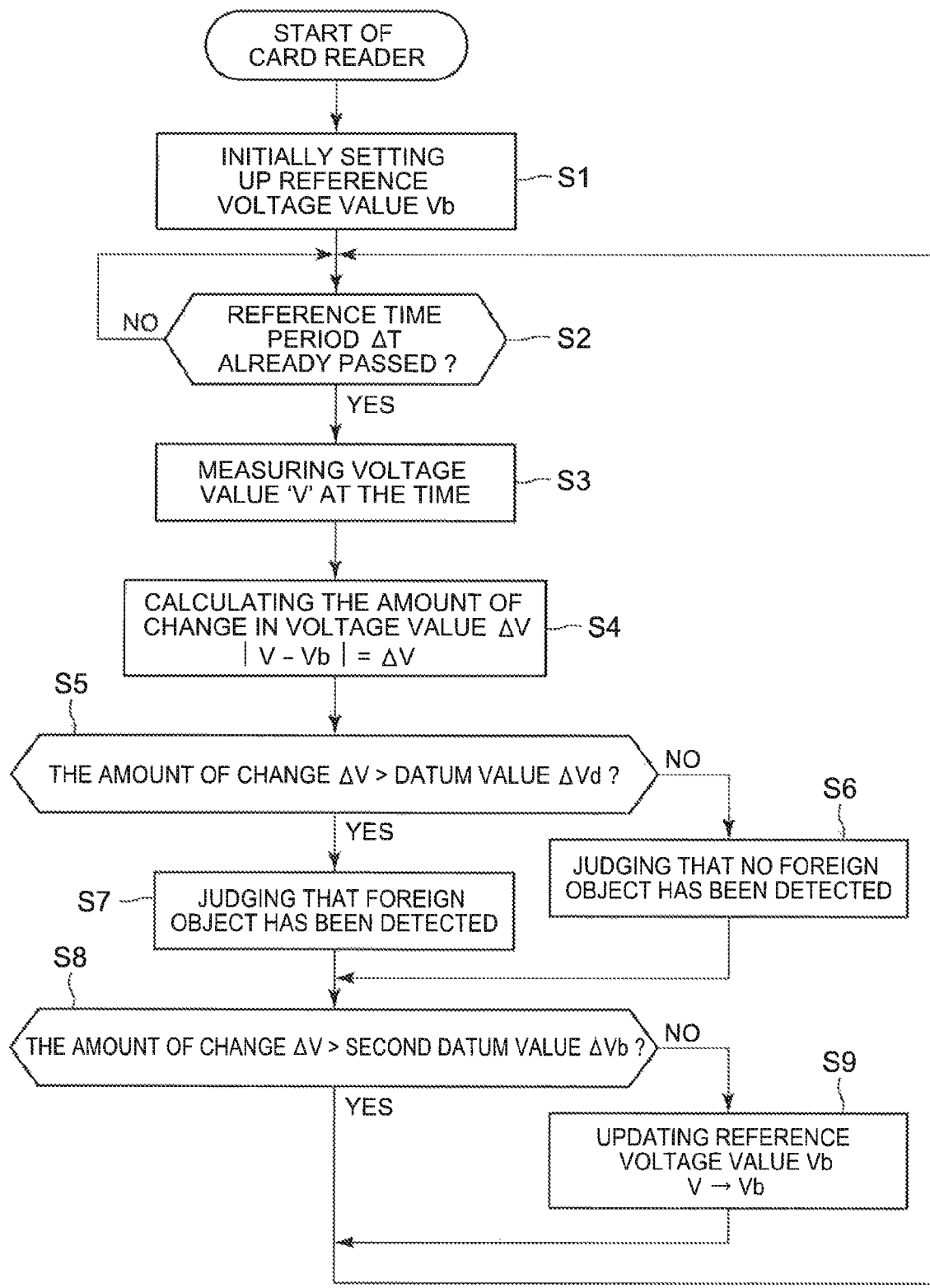
FIG. 5 is a flowchart showing an example of a control workflow of a foreign object detecting process in the card reader shown in FIG. 1.
Figure 6:
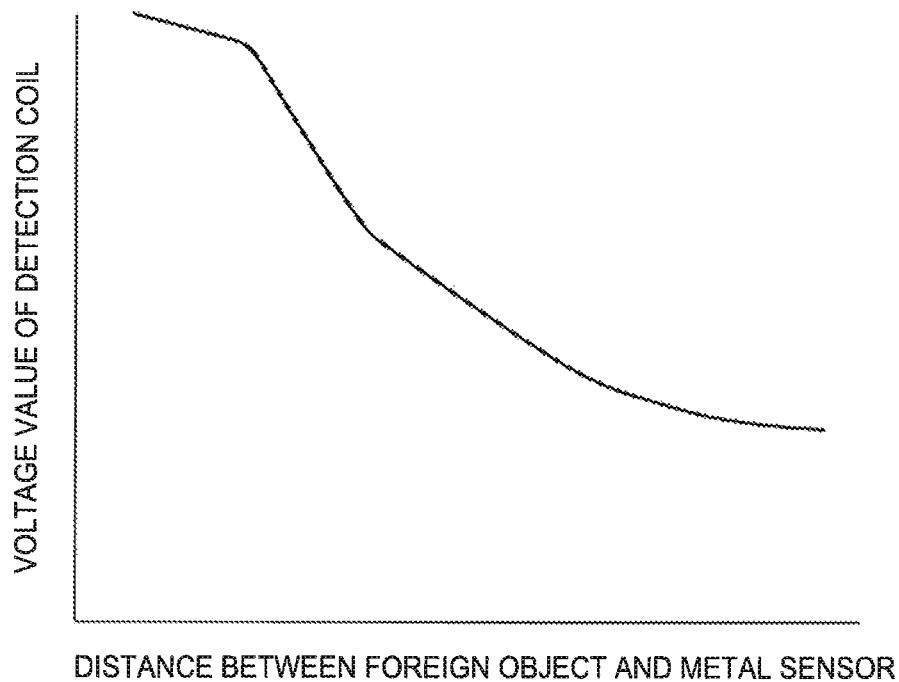
FIG. 6 is a graph showing an example of relationships between a voltage value of a detection coil of a metal sensor for detecting a foreign object and a distance between the foreign object and the metal sensor.
Figure 7:
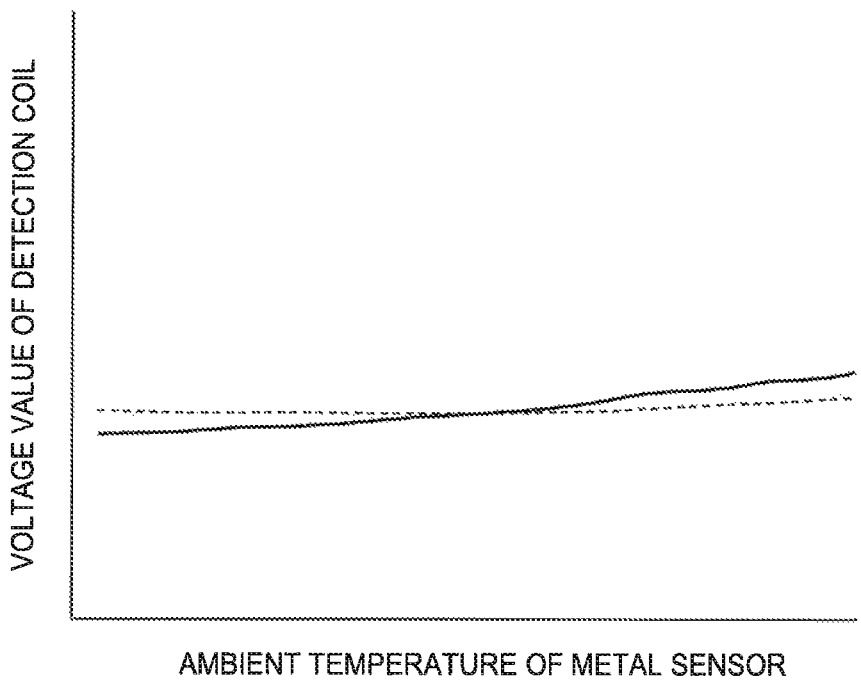
FIG. 7 is a graph showing an example of relationships between a voltage value of the detection coil of the metal sensor for detecting a foreign object and an ambient temperature of the metal sensor.

FIG. 5 is a flowchart showing an example of a control workflow of a foreign object detecting process in the card reader 1 shown in FIG. 1.

In the card reader 1, if a power supply of the card reader 1 gets turned on to start the card reader 1, the control unit 13 initially sets up a reference voltage value Vb with a voltage value of the detection coil 28 at the start time of the card reader 1 (concretely, a steady voltage value) (Step S1). In other words, the control unit 13 initially sets up the reference voltage value with an output value of the metal sensor 21 at the time of turning on the card reader 1. Subsequently, the control unit 13 makes a judgment on whether or not a predetermined reference time period $\Delta T$ has already passed (Step S2); and then if the predetermined reference time period $\Delta T$ has already passed, the control unit 13 measures a voltage value V of the detection coil 28 at the time when the reference time period $\Delta T$ has passed (Step S3). Namely, the control unit 13 measures an output value of the metal sensor 21 at the time when the reference time period $\Delta T$ has passed, if the predetermined reference time period $\Delta T$ has already passed.

Subsequently, the control unit 13 calculates the amount of change in voltage value $\Delta V$ of the detection coil 28 in the reference time period $\Delta T$ (namely, the amount of change in the output value of the metal sensor 21) (Step S4). Specifically, at Step S4, the control unit 13 calculates a difference between the reference voltage value Vb and the voltage value V of the detection coil 28 at the time when the reference time period $\Delta T$ has passed, as the amount of change $\Delta V$. Then, the control unit 13 judges whether or not the amount of change $\Delta V$ exceeds a predetermined datum value $\Delta Vd$ (Step S5).

If the amount of change $\Delta V$ is equal to or less than the datum value $\Delta Vd$ at Step S5, the control unit 13 makes a judgment within a lapse of the reference time period $\Delta T$ that no skimming magnetic head 45 is installed around the card insertion part 4 (Step S6). In other words, if the amount of change $\Delta V$ is equal to or less than the datum value $\Delta Vd$ at Step S5, the control unit 13 judges that no foreign object is detected. Moreover, in the case of no foreign object being detected, the control unit 13 controls the card reader 1 in such a way as to draw the card 2 into an internal section of the card reader 1, at the time when the card detector installed at the card insertion part 4 detects the card 2 having been inserted in the insertion slot 3, in order to read magnetic data recorded in the card 2 and to record magnetic data into the card 2.

On the other hand, if the amount of change $\Delta V$ is greater than the datum value $\Delta Vd$ at Step S5, the control unit 13 makes a judgment within a lapse of the reference time period $\Delta T$ that a skimming magnetic head 45 has been installed around the card insertion part 4 (Step S7). In other words, if the amount of change $\Delta V$ is greater than the datum value $\Delta Vd$ at Step S5, the control unit 13 judges that a foreign object has been detected. Moreover, in the case of the foreign object having been detected, the control unit 13 outputs an error occurrence signal to the higher-level control unit 14. Having received the error occurrence signal, the higher-level control unit 14, for example, sounds an alarm in order to prevent an act of skimming. Otherwise, having received the error occurrence signal, the higher-level control unit 14, for example, outputs a predetermined control signal to the control unit 13, in order to prevent an act of skimming. Then, having received the control signal, the control unit 13 controls the card reader 1 in such a way as not to draw the card 2 into the internal section of the card reader 1, even though the card detector installed at the card insertion part 4 detects the card 2 having been inserted in the insertion slot 3.

Then, the control unit 13 judges whether or not the amount of change $\Delta V$ exceeds a predetermined second datum value $\Delta Vb$ that is smaller than the datum value $\Delta Vd$ (Step S8). If the amount of change $\Delta V$ is equal to or less than the second datum value $\Delta Vb$, the control unit 13 carries out updating the reference voltage value Vb to set up the reference voltage value Vb with the voltage value V of the detection coil 28 at the time when the reference time period $\Delta T$ has passed (Step S9), and then returns to Step S2. On the other hand, if the amount of change $\Delta V$ is greater than the second datum value $\Delta Vb$, the control unit 13 returns to Step S2 with the reference voltage value Vb being maintained, without updating the reference voltage value Vb.

Incidentally, the reference time period $\Delta T$ and the second datum value $\Delta Vb$ are set up beforehand; while characteristics of a voltage value fluctuation of the detection coil 28 in association with a fluctuation of the ambient temperature of the metal sensor 21, characteristics of a voltage value fluctuation of the detection coil 28 in association with a variation of a distance between the metal sensor 21 and the skimming magnetic head 45, and an approaching speed of the skimming magnetic head 45 toward card insertion part 4 at the time when the skimming magnetic head 45 is installed at the card insertion part 4, are taken into consideration. Moreover, the datum value ΔVd is set up beforehand in a range equal to or greater than the second datum value ΔVb, while an assumed material and possible dimensions of the skimming magnetic head 45 are taken into consideration. For example, the reference time period ΔT, the datum value ΔVd, and the second datum value ΔVb are one second, 50 mV, and 20 mV, respectively.

(Primary Advantageous Effect of the Present Embodiment)

As explained above, in the present embodiment, the amount of change in voltage value ΔV of the detection coil 28 is calculated, whenever the reference time period ΔT has passed. Then, in the case where the amount of change ΔV exceeds the datum value ΔVd, it is judged that the skimming magnetic head 45 has been installed around the card insertion part 4. Under an environment where the card reader 1 is actually used, the ambient temperature of the metal sensor 21 does not fluctuate suddenly, and therefore a sudden change in the voltage value of the detection coil 28 owing to a fluctuation of the ambient temperature of the metal sensor 21 does not happen. In the meantime, it is hardly expected that the skimming magnetic head 45 is slowly installed at the card insertion part 4 at the time when the skimming magnetic head 45 is installed at the card insertion part 4; and furthermore if once the skimming magnetic head 45 is installed at the card insertion part 4, accordingly the voltage value of the detection coil 28 quickly changes. Therefore, in the present embodiment, by way of comparing the amount of change ΔV to the datum value ΔVd, it becomes possible to appropriately judge whether or not the skimming magnetic head 45 has been installed at the card insertion part 4. Moreover, there is no sudden change in the voltage value of the detection coil 28, owing to the fluctuation of the ambient temperature of the metal sensor 21. Therefore, in the present embodiment, the amount of change ΔV can be calculated, with an impact of the fluctuation of the ambient temperature of the metal sensor 21 being controlled by way of calculating the amount of change ΔV whenever the reference time period ΔT has passed. As described above, in the present embodiment, it becomes possible to appropriately judge whether or not the skimming magnetic head 45 has been installed at the card insertion part 4 even though the ambient temperature of the metal sensor 21 fluctuates.

Furthermore, the present embodiment makes it possible to calculate the amount of change ΔV, with the impact of the fluctuation of the ambient temperature of the metal sensor 21 being controlled. As a result, it becomes possible to control an impact of a variation in temperature-wise fluctuation characteristics of each metal sensor 21, the impact of the variation being exerted on the amount of change ΔV. Therefore, without storing a plurality of datum values ΔVd in the control unit 13 individually with respect to each metal sensor 21, each of the datum values ΔVd being in relation to an ambient temperature of the metal sensor 21; it becomes possible to appropriately judge whether or not the magnetic head 45 has been installed at the card insertion part 4 when an ambient temperature of the metal sensor 21 changes. Therefore, the present embodiment makes it possible to control lowering productivity of manufacturing the card reader 1.

In the present embodiment, a difference between the reference voltage value Vb and the voltage value V of the detection coil 28 after passage of the reference time period ΔT is calculated as the amount of change ΔV. Moreover, according to the present embodiment, in the case where the amount of change ΔV is equal to or less than the second datum value ΔVb, the reference voltage value Vb is updated in such a way that the reference voltage value Vb is set up with the voltage value V of the detection coil 28 after passage of the reference time period ΔT. Therefore, in the present embodiment, it becomes possible to calculate the amount of change ΔV for which an impact of the fluctuation of the ambient temperature of the metal sensor 21 is further controlled. Meanwhile, according to the present embodiment, in the case where the amount of change ΔV is greater than the second datum value ΔVb, the reference voltage value Vb is maintained as it is, without being updated. When the amount of change ΔV is greater than the second datum value ΔVb, there is a chance that a skimming magnetic head 45 is approaching the card insertion part 4 at the time. Therefore, when the amount of change ΔV is greater than the second datum value ΔVb, it becomes possible to appropriately calculate the amount of change ΔV for making a judgment on whether or not the skimming magnetic head 45 has been installed at the card insertion part 4, by way of maintaining the reference voltage value Vb without updating it.

OTHER EMBODIMENTS

Described above is an example of a preferred embodiment according to the present invention. However, the present invention is not limited to the above embodiment and various variations and modifications may be made without changing the concept of the present invention.

In the embodiment described above, the reference voltage value Vb is initially set up by use of a voltage value of the detection coil 28 at the time of turning on the power for the card reader 1. Alternatively, for example, with a temperature sensor 50 (refer to FIG. 2) for measuring the ambient temperature of the metal sensor 21, wherein the temperature sensor 50 being placed in the proximity of the metal sensor 21, the reference voltage value Vb may be initially set up on the basis of a detection result by the temperature sensor 50 at the start time of the card reader 1, regardless of an actual voltage values of the detection coil 28. In this case, even if the skimming magnetic head 45 has been installed at the card insertion part 4 before turning on the card reader 1, the amount of change ΔV for judging whether or not the skimming magnetic head 45 has been installed at the card insertion part 4 can appropriately be calculated by use of the reference voltage value Vb set up initially.

In the embodiment described above, the difference between the voltage value V of the detection coil 28 after passage of the reference time period ΔT and the reference voltage value Vb is calculated as the amount of change ΔV. Alternatively, for example, wherein the voltage value of the detection coil 28 is measured multiple times within the reference time period ΔT, a difference between an average of voltage values of the detection coil 28, measured multiple times, and the reference voltage value Vb may be calculated as the amount of change ΔV.

In the embodiment described above, the metal sensor 21 includes the exciting coils 26 and 27, and the detection coil 28. Alternatively, for example, the metal sensor 21 may include a coil that works for both excitation and detection. Furthermore, although the card reader 1 in the embodiment described above is a card reader of a card-transfer type, including the driving roller 8 and the pad roller 9; a card reader to which an embodiment of the present invention is applied may be a manual card reader that reads out and records magnetic data while a user manually moves the card 2. For example, a card reader to which a configuration of the present invention is applied may be a card reader of a so-called dip type, which reads out and records magnetic data at the time when the card 2 is inserted into or pulled out of the card reader.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card having magnetic data recorded thereon, the card reader comprising:
    a magnetic head for carrying out at least one of reading the magnetic data recorded in the card and recording the magnetic data into the card;
    a card insertion part where an insertion slot for inserting the card is formed;
    a metal sensor structured to detect a foreign object, which contains a metallic material, having been installed around the card insertion part; and
    a control unit;
    wherein the control unit is structured to calculate the amount of change in an output value of the metal sensor, whenever a predetermined reference time period has passed, and judge that the foreign object has been installed around the card insertion part if the amount of change exceeds a predetermined reference value;
    wherein the control unit is structured to calculate a difference between a reference output value and an output value of the metal sensor at the time when the reference time period has passed, as the amount of change; and is structured to set up the reference output value with an output value of the metal sensor at the time of turning on the card reader; and
    if the amount of change is equal to or less than a predetermined second datum value that is smaller than the reference value, updating the reference output value is carried out to set up the reference output value with an output value of the metal sensor at the time when the reference time period has passed; and
    if the amount of change is greater than the second datum value, updating the reference output value is not carried out in such a way as to maintain the reference output value.

2. The card reader according to claim 1;
    wherein the metal sensor comprises a core formed of a magnetic material, a plurality of exciting coils that are wound on the core, and a detection coil that is wound on the core between the couple of exciting coils in an axis direction of the core;
    under conditions where the foreign object does not exist in a detectable area of the metal sensor, no voltage is generated between both terminals of the detection coil;
    if the foreign object exists in the detectable area of the metal sensor, a voltage is generated between both the terminals of the detection coil; and
    the output value of the metal sensor is a value of the voltage between both the terminals of the detection coil.

3. A card reader for use with a card having magnetic data recorded thereon, the card reader comprising:
    a magnetic head for carrying out at least one of reading the magnetic data recorded in the card and recording the magnetic data into the card;
    a card insertion part where an insertion slot for inserting the card is formed;
    a metal sensor structured to detect a foreign object, which contains a metallic material, having been installed around the card insertion part; and
    a control unit;
    wherein the control unit is structured to calculate the amount of change in an output value of the metal sensor, whenever a predetermined reference time period has passed, and judge that the foreign object has been installed around the card insertion part if the amount of change exceeds a predetermined reference value;
    wherein the card reader comprises a temperature sensor structured to measure an ambient temperature of the metal sensor, the temperature sensor being placed in the proximity of the metal sensor; and
    the control unit is structured to calculate a difference between a reference output value and an output value of the metal sensor at the time when the reference time period has passed, as the amount of change; and moreover initially sets up the reference output value, on the basis of a detection result by the temperature sensor, at the time of turning on the card reader; and
    if the amount of change is equal to or less than a predetermined second datum value that is smaller than the reference value, updating the reference output value is carried out to set up the reference output value with an output value of the metal sensor at the time when the reference time period has passed; and
    if the amount of change is greater than the second datum value, updating the reference output value is not carried out in such a way as to maintain the reference output value.

4. The card reader according to claim 3;
    wherein the metal sensor comprises a core formed of a magnetic material, a plurality of exciting coils that are wound on the core, and a detection coil that is wound on the core between the couple of exciting coils in an axis direction of the core;
    under conditions where the foreign object does not exist in a detectable area of the metal sensor, no voltage is generated between both terminals of the detection coil;
    if the foreign object exists in the detectable area of the metal sensor, a voltage is generated between both the terminals of the detection coil; and
    the output value of the metal sensor is a value of the voltage between both the terminals of the detection coil.

5. A control method for a card reader for use with a card having magnetic data recorded thereon, the card reader comprising a magnetic head for carrying out at least one of reading magnetic data recorded in a card and recording magnetic data into the card; a card insertion part where an insertion slot for inserting the card is formed; and a metal sensor for detecting a foreign object, which contains a metallic material, having been installed around the card insertion part; the method comprising
    calculating an amount of change in an output value of the metal sensor whenever a predetermined reference time period has passed; and
    judging that the foreign object has been installed around the card insertion part if the amount of change exceeds a predetermined reference value;
    wherein a difference between a reference output value and an output value of the metal sensor, at the time when the reference time period has passed, is calculated as the amount of change; and the reference output value is initially set up with an output value of the metal sensor at the time of turning on the card reader; and if the amount of change is equal to or less than a predetermined second datum value that is smaller than the reference value, updating the reference output value is carried out to set up the reference output value with an output value of the metal sensor at the time when the reference time period has passed; and if the amount of change is greater than the second datum value, updating the reference output value is not carried out in such a way as to maintain the reference output value.

* * * * *